June 5, 1973
G. SCHMIDT
3,737,363
DENTAL FILM STRIPPER
Filed Aug. 15, 1969
6 Sheets-Sheet 1
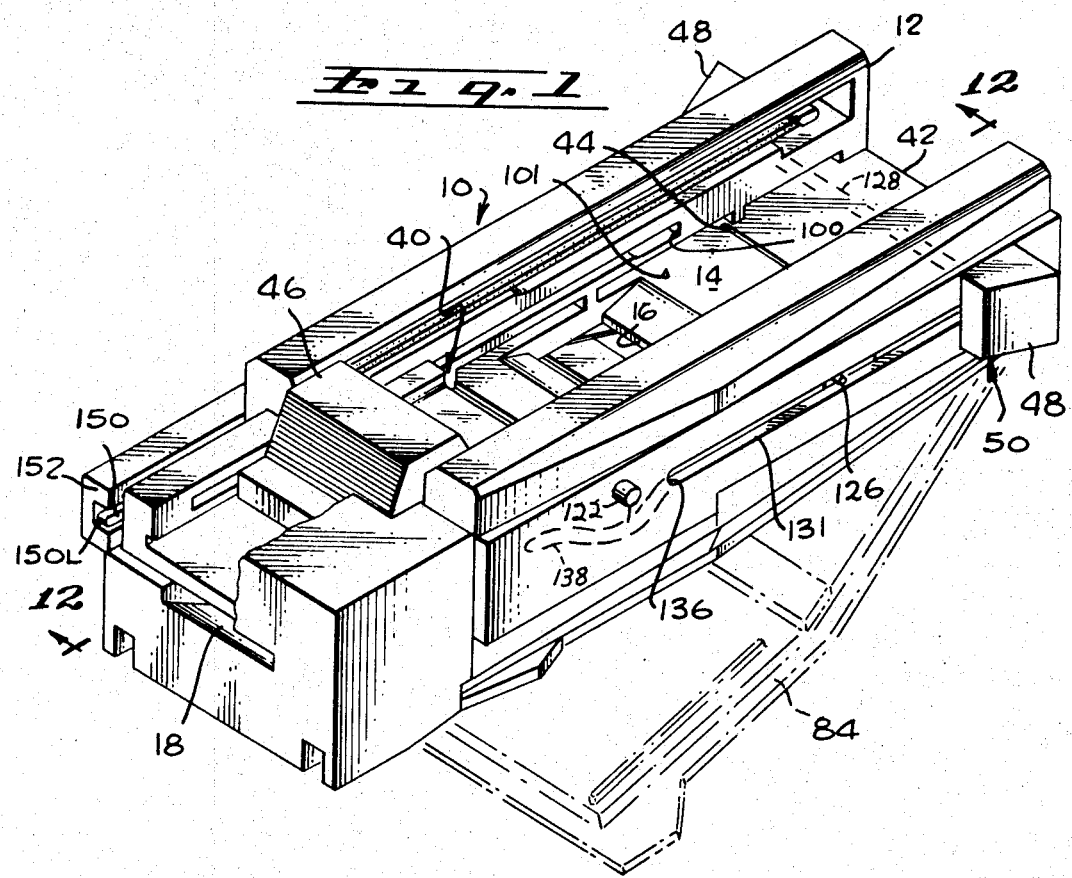
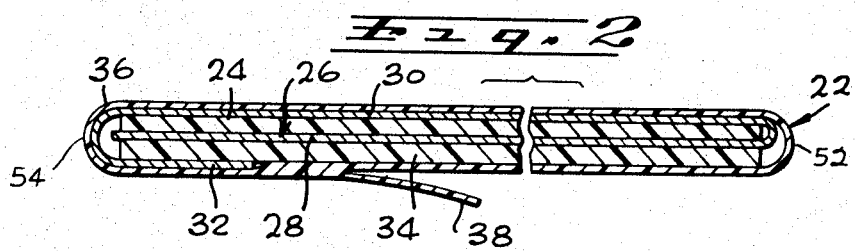
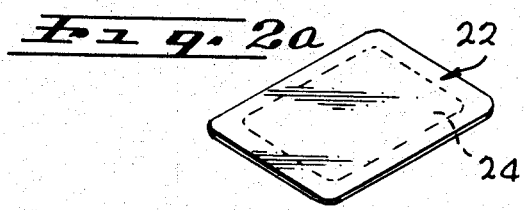
GUNTER SCHMIDT
INVENTOR.
BY
Lindenberg & Freilich
ATTORNEYS

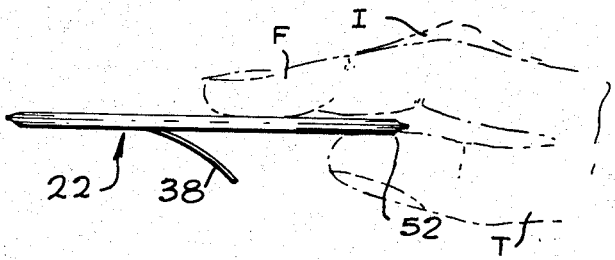
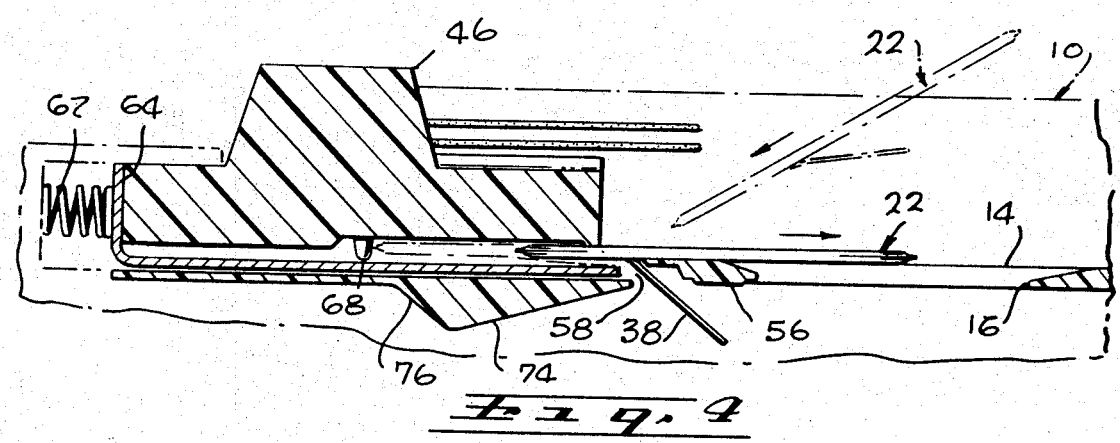
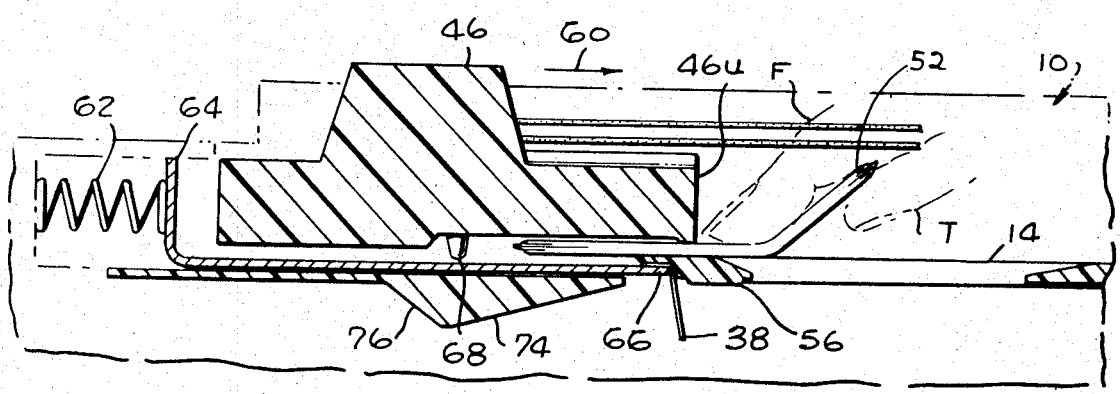

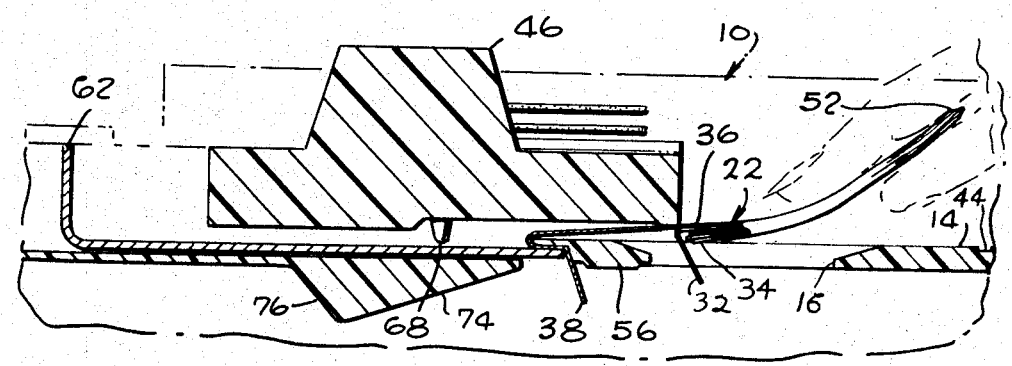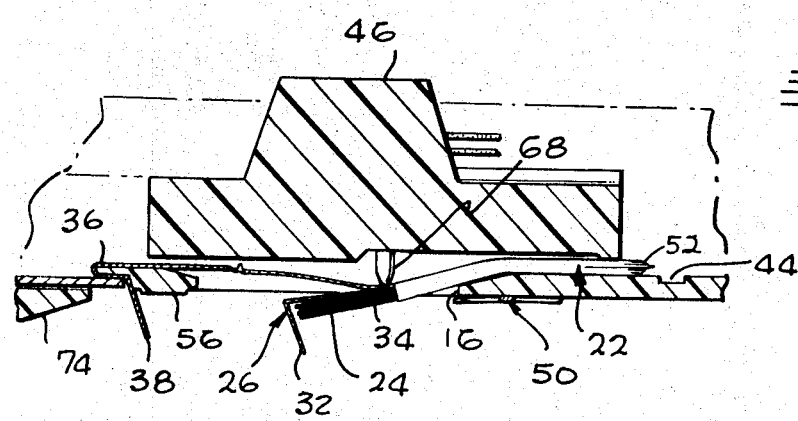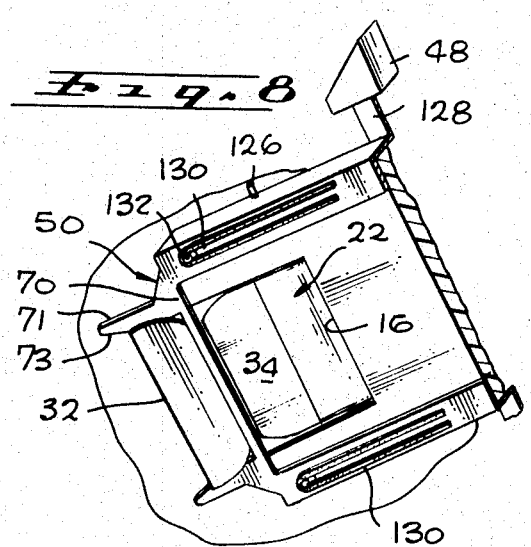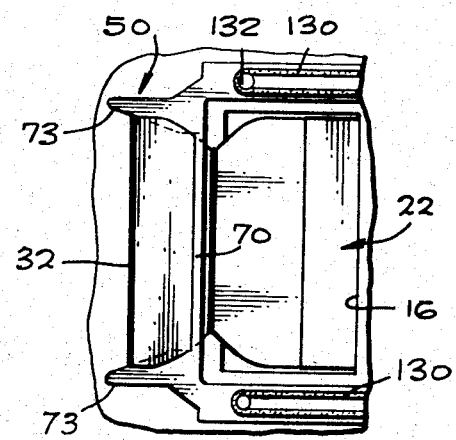

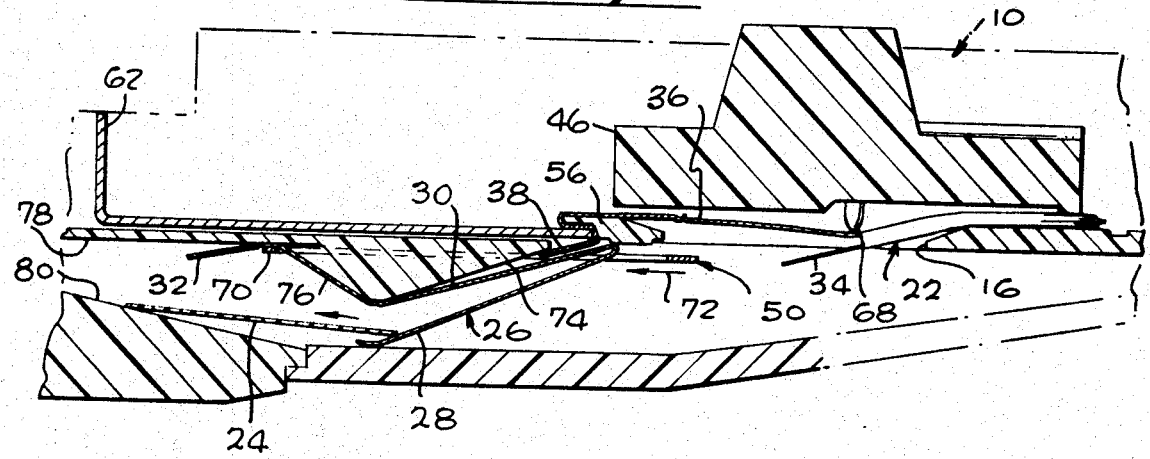
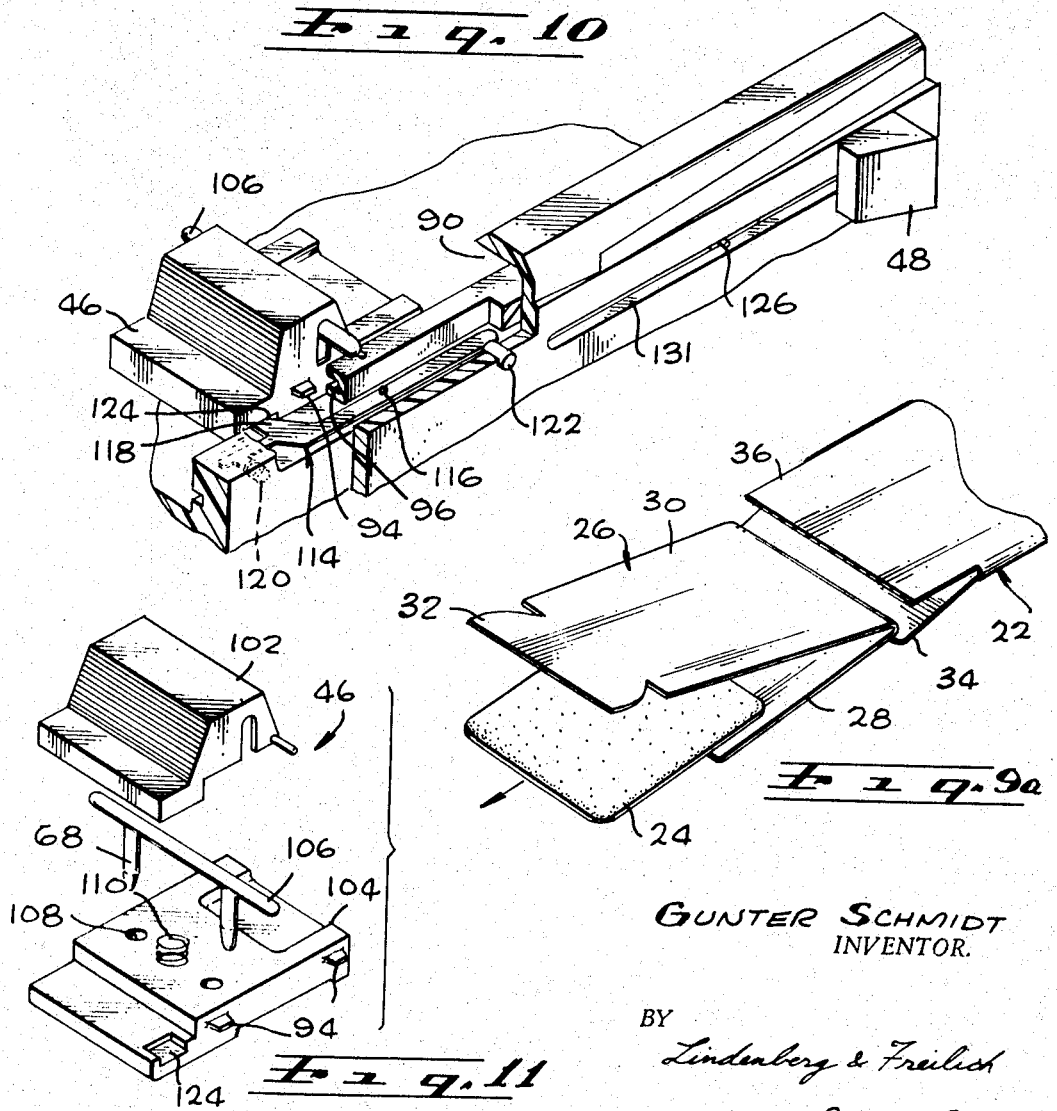

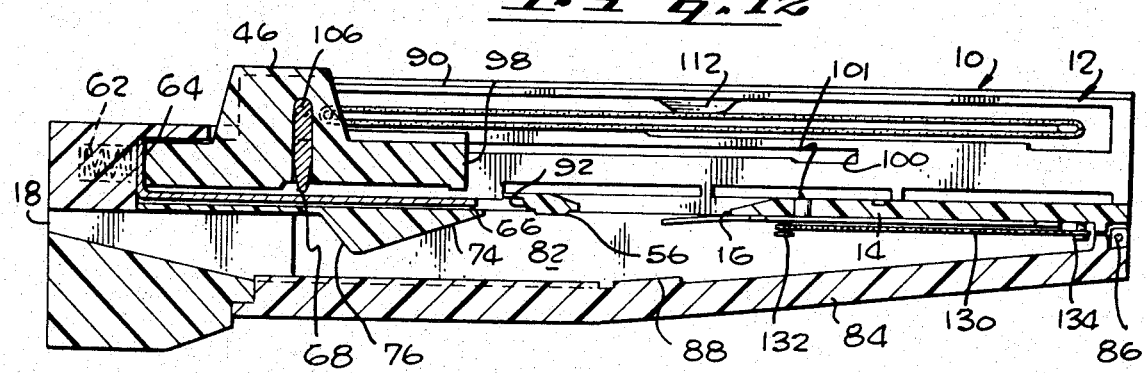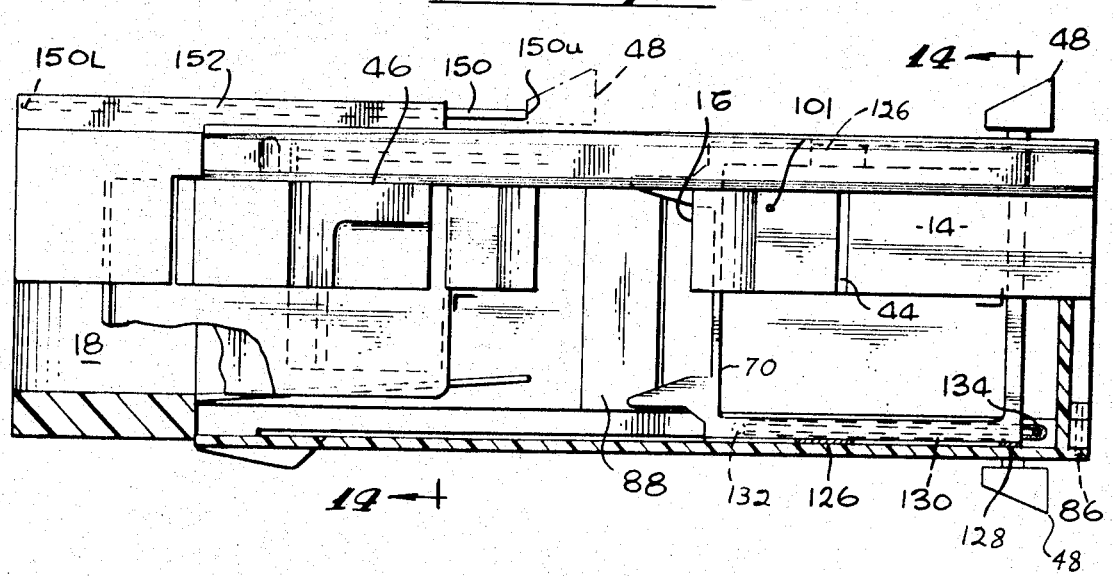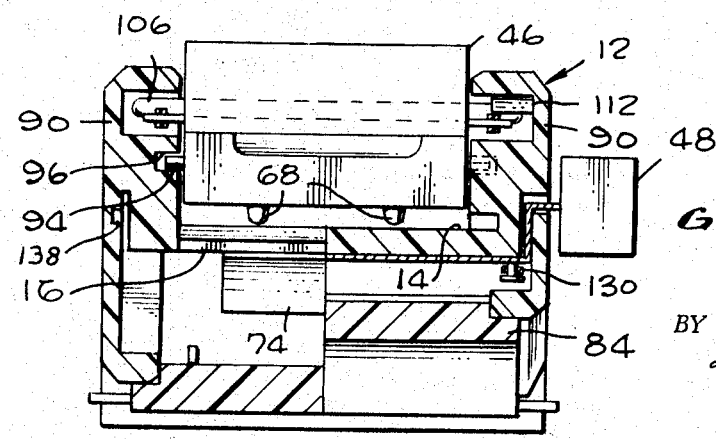

June 5, 1973 G. SCHMIDT 3,737,363
DENTAL FILM STRIPPER

Filed Aug. 15, 1969 6 Sheets-Sheet 6

GUNTER SCHMIDT
INVENTOR.

BY
Lindenberg & Freilich
ATTORNEYS

United States Patent Office 3,737,363
Patented June 5, 1973

3,737,363
DENTAL FILM STRIPPER
Gunter Schmidt, Marina Del Rey, Calif., assignor to Productron, Inc., Los Angeles, Calif.
Continuation-in-part of application Ser. No. 732,186, May 27, 1968, now Patent No. 3,559,554. This application Aug. 15, 1969, Ser. No. 850,477
Int. Cl. B32b *31/16;* G03d *3/08*
U.S. Cl. 156—584        11 Claims

ABSTRACT OF THE DISCLOSURE

A stripping device for use with a dental film package that includes a film chip contained within an outer protective covering, to strip the package in daylight and enable insertion of the chip into a film processing machine. The device includes a light-tight housing with a member that engages a tab on the outer covering of the film package, so that the package can be manually pulled along the outside of the housing to peel off the covering from one end of the package while moving that end over a slot in the housing. A slide within the housing then can be moved to draw the contents of the film package out of the covering and through the slot into the housing, so the film chip can fall through an exit and into the developing machine.

CROSS REFERENCE TO RELATED APPLICATION

This application is a continuation-in-part of patent application Ser. No. 732,186 filed May 27, 1968, now U.S. Pat. No. 3,559,554.

BACKGROUND OF THE INVENTION

Field of the invention

This invention relates to film processing apparatus, and more particularly, to apparatus for stripping a protective covering from a film chip.

Description of the prior art

Dental X-ray photographs are generally made using film packages that comprise a small stiff chip of film sandwiched between thin cardboard layers, and having a soft plastic covering that completely envelopes the cardboard-chip sandwich and a lead sheet positioned against it. The developing of such film chips has generally required darkrooms, wherein the package was hand opened and the film chip dipped into tanks of processing chemicals. However, patent application Ser. No. 732,186, filed May 27, 1968 by the present applicant, describes a processing system including apparatus for stripping a film chip in a lighted room and a processor for receiving the uncovered chip and developing it in a lighted room. While the stripping apparatus described in that application functions satisfactorily to uncover the film chip and load it into the processor, an even simpler and more reliable stripping apparatus would be desirable.

OBJECTS AND SUMMARY OF THE INVENTION

One object of the present invention is to provide apparatus for processing dental film in an ordinary lighted room.

Another object of the invention is to provide apparatus for stripping a covering from a film chip and feeding the chip into a light-tight developing machine in an ordinary lighted room.

In accordance with the present invention, apparatus is provided for stripping away the protective covering of a film chip package and loading the chip into a developing machine, in an ordinary lighted room. The film package generally includes an outer protective covering with a tab, an inner cardboard sandwich or wrap around, a film chip within the cardboard sandwich, and a lead sheet positioned against the cardboard sandwich. The stripping apparatus includes a substantially light-tight housing with an opening for receiving the inner cardboard sandwich that surrounds the film chip. A clamping mechanism on the housing can engage the tab on the package so that when the package is pulled, part of the protective outer covering is peeled away and the cardboard sandwich protrudes through the opening into the housing. A slide within the housing then can be moved to engage the protruding sandwich to draw it fully into the housing. As the sandwich is drawn in, the film chip is released to fall free. The slide is operated while one end of the housing is inserted into a developing machine, so the free-falling film chip falls through an exit aperture in the housing and into the developing machine where it is developed.

The novel features of the invention are set forth with particularity in the appended claims. The invention will best be understood from the following description when read in conjunction with the accompanying drawings.

BRIEF DESCRIPTION OF THE DRAWINGS

FIG. 1 is a perspective view of stripping apparatus constructed in accordance with the invention;

FIGS. 2 and 2a are sectional and perspective views, respectively, of a dental film chip package, of a type which can be used in the stripper apparatus of FIG. 1;

FIGS. 3–9a illustrate portions of the stripper apparatus of FIG. 1, showing the steps involved in its operation;

FIG. 10 is a partial, sectional perspective view of the stripper apparatus of FIG. 1;

FIG. 11 is an exploded perspective view of the cover slide of FIG. 10;

FIG. 12 is a sectional view taken on the line 12—12 of FIG. 1;

FIG. 13 is a partial plan, partially sectional view of the apparatus of FIG. 1;

FIG. 14 is a sectional view taken on the line 14—14 of FIG. 13;

DESCRIPTION OF THE PREFERRED EMBODIMENTS

Figure 15:
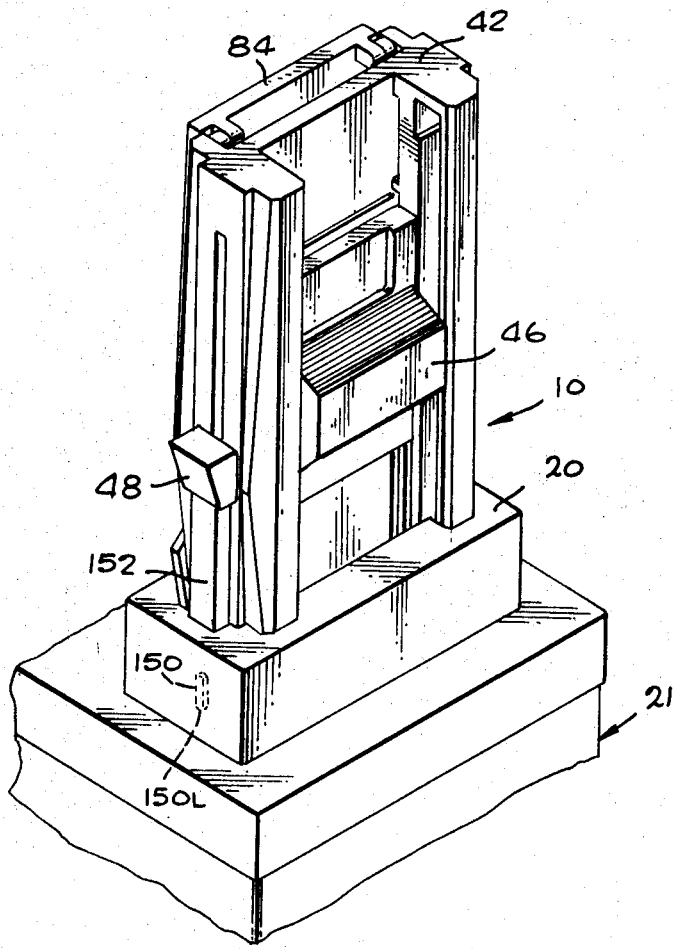
FIG. 15 is a partial perspective view showing the stripper apparatus of FIG. 1 in place in a processing machine constructed in accordance with the invention.

FIG. 1 illustrates a stripper device 10 comprising a housing 12 that forms a substantially light-tight chamber. A dental film package is placed on a package supporting wall 14, and one end of the package is peeled away. The film chip within the package then passes through an aperture or slot 16 in the wall to enter the inside of the housing. The film chip falls through the housing and exits therefrom through an exit slot 18. Prior to manipulating the stripper apparatus to allow the film chip to fall through the exit slot 18, the stripper apparatus is inserted into a receiving member 20 of a film developer 21, as shown in FIG. 15. Thus, as the chip exits from the stripper housing, it enters the developing machine 21 where the film chip is developed. Inasmuch as the stripper housing is held with the slot 18 opening downwardly when engaged with the developing machine, the end of the housing with slot 18 may be referred to as the lower end, while the opposite end 42 may be referred to as the upper end.

FIG. 2 is an enlarged sectional view of a typical dental film chip package of a type which can be stripped by the stripper apparatus of the invention. The package 22 comprises a film chip 24 which is typically a stiff sheet of transparent plastic with a photographic emulsion thereon. A sandwich 26 of thin stiff cardboard is disposed against the two faces of the film chip. The cardboard sandwich includes an inner sheet 28 disposed against one face of the film chip, an outer sheet 30 disposed against the opposite face of the film chip, and a flap 32 extending from the outer sheet. A lead sheet 34 is disposed against the inner cardboard sheet, and the cardboard flap 32 extends around the lead sheet. An encapsulating envelope 36 of soft plastic is disposed around the other layers, including the edges of the layers, to form a light-tight capsule or package. A tab 38 is formed in the encapsulating envelope, on a face thereof adjacent to the lead sheet.

The package 22 can be opened by hand, instead of with the stripper apparatus, but a darkroom is then required. Hand opening of the package is generally accomplished by pulling on the tab 38 to peel away the encapsulating envelope. The cardboard flap 32 is lifted and the film chip 24 is removed from the cardboard sandwich for developing. The stripper apparatus of the invention is constructed to strip away part of the protective coverings on the film chip and extract the chip from the package to prepare it for developing. This is accomplished while protecting the chip from ambient light, thereby eliminating the need for a darkroom.

Referring again to FIG. 1, the stripping of a film package is accomplished by first engaging the tab on the package in a tab engaging assembly 40. The package is then manually pulled along the package supporting wall 14 toward the upper end 42 of the housing, until the upper end of the package reaches a line 44 marked on the wall. A cover slide 46 moves over the package as it is drawn toward the line 44. At this stage of the stripping process, the tab and part of the encapsulating envelope have been peeled away from one end of the package, and the cardboard sandwich, with the film chip therein, protrudes through the slot 16 into the inside of the housing 12. The cover slide 46 helps to hold down the peeled end of the package against the package supporting wall 14, and helps prevent the passage of light around the edges of the film package and through the slot 16.

At the stage when the cardboard sandwich protrudes through slot 16, the housing 12 is placed on the developing machine 21 in the manner shown in FIG. 15. Then, the handles 48 of a separating slide 50 that moves within the housing, are pushed down. The separating slide pulls the cardboard sandwich out of the encapsulating envelope and through the slot 16 into the housing. It then separates the cardboard sheets of the sandwich to allow the film chip to fall free within the housing. The film chip falls down through the housing and exits through the exit slot 18 to enter the developing machine. A shroud 20 on the developing machine surrounds the lower end of the housing to prevent exposure of the film as it passes out of the stripper housing and into the developing machine.

FIGS. 3–9 illustrate the steps in the stripping process. As shown in FIG. 3, the first step is bending down the tab 38 of the package and grasping the upper end 52 of the package between the thumb T on one side and the forefinger F and index finger I on the other side.

As shown in FIG. 4, the film package is then inserted into the space beneath the cover slide 46 while the slide is in its lower position. The upper end 52 of the package is held close to the package-supporting wall 14 while it is pulled upward, so that the tab 38 is guided by a tab guiding member 56 through a tab receiving slot 58. During the steps shown in FIG. 4, the cover slide 46 is retained in its lower position by a latching mechanism. After the tab on the film package is in place in slot 58, the latching mechanism can be released to allow the slide 46 to move upwardly.

As shown in FIG. 5, release of the slide 46 allows it to move upwardly in the direction of arrow 60 under the force of a spring 62. The spring 62 presses a tab-engaging member 64 to move it upwardly, until an end 66 thereof presses the tab 38 against the tab guide 56 to securely hold the tab in place. The tab-engaging member 64 pushes the cover slide 46 a small distance and the slide generally continues to move upwardly until its upper end 46U strikes the forefinger F and index finger I of the operator. The operator continues to hold the upper end 52 of the package in the manner shown in FIG. 5.

As shown in FIGS. 6 and 7, the operator draws the package up along the package supporting wall 14 until the upper end 52 of the package reaches a position near the indicating line 44. At this position, one portion of the encapsulating envelope 36 has been completely peeled from one side of the package at one end thereof, and there is substantial resistance to any further pulling of the package 22 upward along the housing. When the package reaches this position, the cardboard sandwich 26 and lead sheet 34 protrude through the slot 16 into the inside of the housing. The operator then lays the upper end 52 of the package down against the package supporting wall 14.

The cover slide 46 generally follows the package up along the housing, although it may stop slightly short of the position shown in FIG. 7. The operator grasps the slide 46 and pushes it further up the housing until it reaches the position shown in FIG. 7. As the slide approaches the position of FIG. 7, a depressing member 68 carried by the slide moves down against the film package. The depressing member pushes the package further through the slot 16 so that the flap 32 projects well into the housing. When the apparatus is in the position of FIG. 7, the housing may be positioned on the developer machine, inasmuch as the next step of the process releases the film chip 28 to allow it to fall through the housing.

The next operation is the movement of the separating slide 50. As shown in FIGS. 8 and 8a, which are bottom illustrations of the slide 50 after it has been moved partially upward, the slide has a flap-engaging arm 70 which can engage the flap 32 on the cardboard package to draw the package into the inside of the housing. The arm 70 has a laterally extending center portion that lies on one face of flap 32, and angled side portions 73 that lie on the other face of the flap, to trap the flap securely between them. The separating slide 50 is moved down, as shown in FIG. 9, in the direction of arrow 72. The flap-engaging arm 70 engages the flap 38 to draw the cardboard sandwich 26 into the housing, while the encapsulating envelope 36 and the lead sheet 34 remain behind. As the flap-engaging arm 70 moves down through the housing, it follows along a sandwich guiding wall 74 which has a recess portion 76. As the arm moves into the recess 76, it bends one cardboard sheet 30 from which the flap 32 extends, away from the other sheet 28 of the sandwich. This opens up the sandwich, allowing the film chip 24 to fall free from it. The film chip 24 falls down through the housing, being guided by walls 78, 80 that lead it to the exit slot 18. The film chip then falls through an opening in the developing machine where it is carried through tanks of chemicals that develop the image thereon.

FIGS. 12 and 13 illustrate the details of construction of the stripper apparatus. The housing 12 has a substantially light-tight chamber 82 formed by the package supporting wall 14 at one side, and by a cover 84 at the other side. The cover 84 is provided to allow removal of the covering portions of the film package after the package has been stripped and the film chip inserted in the developing machine. The cover is hinged at 86, and has a latch 88 that keeps it closed while allowing it to be opened by a hard pull.

The housing has walls 90 on either side of the package-supporting wall 14 that extend away from the chamber portion 82. The tab engaging member 64 is slidably mounted between the walls 90, and is biased toward its upward position by the spring 62. The tab guiding member 56 has a lower tab engaging portion 92 that is constructed to closely receive the upper end 66 of the tab engaging member. Accordingly, the tab on the film package its held securely between them when the member 64 is released. The slide 46 can move downwardly along the housing until it contacts the tab engaging member 64, and can move upwardly along the housing until an upward end 98 of the slide abuts stops 100 positioned near the upper end of the housing. In order to more securely hold the outer covering of the film package on the package supporting wall 14 as the cardboard sandwich is being drawn through the slot 16, a pair of pins 101 are provided in the wall 14. The pins engage the outer covering of the package when it is pushed down on the wall 14 to hold it stationary.

As shown in FIGS. 10 and 11, the cover slide 46 has bosses 94 on either side that are received in guiding slots 96 in each wall 90 of the housing. The slide 46 includes an upper portion 102 and a lower portion 104 that are held together by screws (not shown). The depressing members 68 are mounted on a bar 106 and project through holes 108 in the bottom portion of the slide. A spring 110 urges the bar 106 of the depressing assembly away from the package supporting wall of the housing. As shown in FIG. 12, depressing cams 112 are provided on each wall 90 of the housing, at a position over the slot 16 through which the film chip enters the inner chamber 82 of the housing. When the slide 46 is moved upwardly along the package supporting wall 14, the bar 106 is depressed by the cam 112 as the depressing members 68 move to a position over the slot 16. Thus, the depressing members 68 automatically push the package partially into the slot when the slide is moved up.

Prior to using the film stripper apparatus the slide 46 and tab engaging member 64 must be moved to the extreme downward position. They are held in this position by a retainer lever 114, as shown in FIG. 10. The retainer lever 114 is pivotally mounted on the housing at 116, and has a slide engaging portion 118 near one end. A spring 120 urges the lever toward a position where the portion 118 engages the slide, while a button 122 at the opposite end enables manual operation of the lever. When the slide is pushed toward its extreme downward position, the lever portion 118 rides over the lower end of the slide and falls into a recess 124 in the slide. The lever then prevents upward movement of the slide. The slide is urged upwardly by the tab engaging member 64 which is biased upwardly by the spring 62. Only after the lower end of the package has been inserted under the slide 46, is the release button 122 pressed in. The slide 46 is then released and it and the tab engaging member 64 can move upwardly.

The separating slide 50, which is best shown in FIG. 13, is a thin member with four sides, one side forming the flap engaging arm 70 that engages the flap on the cardboard envelope. The slide is guided by a pair of lower pins 126 that protrude from either side, and a shaft 128 that extends through the upper end of the slide. Both the pins 126 and shaft 128 engage a slot on either side of the housing. The handles 48 that are manually pressed to move the slide within the housing are mounted on opposite ends of the shaft 128. The slide 50 is biased toward an upward position by a pair of rubber bands 130 that extend between pins 132 on the slide and pins 134 fastened near the upper end of the housing.

As shown in FIG. 1, the guiding slot 131 has an upper portion along which the shaft 128 moves, with an end 136 that abuts the shaft 128 when it is moved down to its exterme lower position. The slot also has a lower section 138 which does not extend all the way through the housing walls, but is substantially a groove formed on the inner side of the housing walls. The portion 138 does not extend in a straight line, but extends in a curve that substantially follows the curvature of the sandwich guiding wall 74. Thus, as the separating slide 50 is moved down, the flap engaging arm 70 moves the flap of the film package sandwich along the contour of the sandwich guiding wall 74. The flap follows into the recess 76 of wall 74 to separate the sandwich sheets and allow the film chip to fall free.

Figure 16:
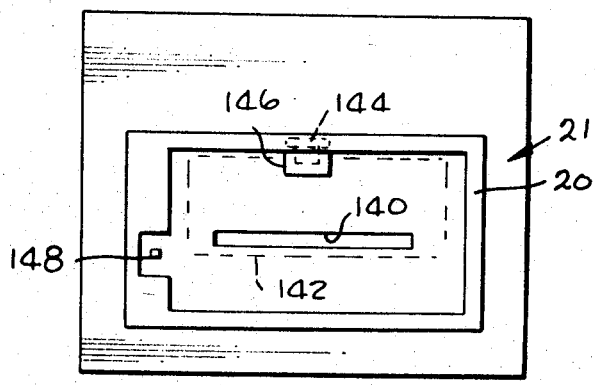
FIG. 16 is a partial plan view of the developing apparatus of FIG. 15.

The developing machine 21, shown in FIGS. 15 and 16, which develops the film chip after it exits from the stripper housing, has a chip receiving slot 140 which is designed to be aligned with the exit slot 18 of the stripper housing. A cover 142 is positioned beneath the slot 140 to prevent the entrance of light therein. The cover 142 is mounted on an arm 144 which has an operating protuberance 146 thereon. The arm 144 is biased toward a position where the protuberance 146 is within the area where the bottom of the stripper housing is normally received. When the stripper housing is inserted into the shroud or receiving member 20, it pushes the protuberance 146, thereby pivoting the arm 144 so that the cover 142 moves away from the film chip receiving slot 140. When the stripper housing is removed from the receiving member 20, the cover 142 automatically moves back to a position where it seals the opening 140.

The developing machine 21 operates in a cycle of predetermined duration, wherein it moves a chip just received through the opening 140 through several developing baths. The developing cycle commences when a start button 148 is depressed. The stripper apparatus is designed so that the button 148 is depressed automatically as the film chip is released to fall into the opening 140 in the developing machine. To accomplish this, the stripper housing is provided with a rod 150 which is slidably mounted in a rod housing portion 152 formed at one side of the stripper housing. The rod 150 is biased toward an upper position wherein the lower end 150L does not protrude from the bottom of the stripper housing. The rod is long enough so that when its lower end 150L does not protrude from the housing, the upper end 150U protrudes from the upper end of the slide housing portion. When the handles 48 are pushed down to move the separating slide within the housing, one of the handles 48 presses down on the rod 150 to depress it, so that the lower end pushes down on the starter button 148 of the developing machine. Thus, when the handles 48 are pushed down so that the separating slide draws in the cardboard sandwich and releases the film chip to fall through the exit slot 18 in the stripper housing, the developing machine 21 is started. The developing machine 21 may be of a type described in the earlier identified patent application S.N. 732,186, and the starter button 148 connected in parallel with a directly manually operated start button.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for disassembling a film chip package which includes a light-tight envelope about a film chip comprising:

a substantially light-tight stripper housing including a wall with an aperture for receiving said film chip, said wall having an outer side lying outside said housing and having an opposite inner side that faces the inside of said housing, said outer side adapted to receive and hold said film chip package;

envelope engaging means mounted on said housing and having a portion at the outer side of said wall for engaging the envelope of a film package lying at said outer side to peel away part of said envelope, said envelope engaging means positioned so that part of said film chip lies substantially over said aperture when said part of said envelope has been peeled away;

means movable over a package to hold it against said outer side of said wall, to help prevent the entrance of light through said aperture into the inside of said housing;

means within said housing for drawing said film chip of said envelope and through said aperture into said housing; and means for allowing the exit of said film chip from said housing.

2. The apparatus described in claim 1 wherein:
said means movable over a package includes a slide movable over a package which is over said aperture.

3. The apparatus described in claim 1 wherein:
said package includes a protective layer for covering at least one face of said film chip, said protective layer having a flap thereon; and
said means for drawing said film chip into said housing comprises a slide with an arm for engaging said flap on said protective layer, said arm mounted for movement away from said aperture to draw in said layer so that said chip moves in with said layer.

4. The apparatus described in claim 1 wherein:
said package includes a protective sandwich with layers disposed on opposite faces of said film chip, a first of said layers having a flap thereon; and
said means for drawing said film chip into said housing comprises a slide with an arm for engaging said flap, means for moving said arm away from said aperture to draw in said sandwich with said film chip therein, and means for bending said first layer to open up said sandwich to allow said chip to fall out from between said layers.

5. The apparatus described in claim 1 wherein:
said envelope includes a tab;
said envelope engaging means comprises walls forming a slot for receiving said tab, said slot spaced from said aperture, and a tab engaging member movable against a wall of said slot to hold said tab thereagainst;
said means movable over a package includes a slide movable over said aperture to hold said package closely over said aperture; and
means coupling said slide and tab engaging member for holding said tab engaging member away from said wall of said slot when said slide is moved to a predetermined position away from said aperture.

6. Apparatus for disassembling a film chip package with opposite end portions which includes an outer protective covering with a tab, and a film chip, comprising:
a housing with an exposed outer package supporting wall, said package supporting wall having a slot for passing said film chip into said housing;
tab engaging means for engaging said tab, to enable removal of part of said outer covering from a first end portion of said package by separation of the rest of said package away from said tab engaging means while it engages said tab, said tab engaging means mounted on said housing so that said first end portion of said package lies over said slot when said package has been separated from said tab engaging means;
means for covering at least part of said first end portion of said package when it is over said slot; and
means for drawing said film chip out of said protective covering and through said slot into said housing.

7. The apparatus described in claim 6 wherein:
said tab engaging means is positioned a distance from said slot, to enable said package to be peeled by pulling it away from said tab engaging means so that said first end portion of said package moves toward said slot; and
said means for covering a portion of said package comprises a member slidably mounted on said housing for movement with said package toward said slot, said member mounted to hold said first end portion of said package close to said package supporting wall.

8. Apparatus for disassembling a film chip package which includes an outer protective cover with a tab, an inner protective sandwich with a flap thereon, and a film chip within said sandwich, comprising:
a substantially light-tight housing with an exposed package supporting wall, said wall having a slot therein;
tab engaging means spaced from said slot to hold said tab so that said package can be pulled to peel off an end of said package while moving it to a position over said slot;
a first slide movable over said package to hold the peeled end thereof close to the walls of said slot; and
a second slide movable within said housing, including a arm for engaging said flap to draw said sandwich into said housing.

9. The apparatus described in claim 8 including:
means for guiding said flap engaging arm along the inside of said housing along a path that separates it from the opposite sandwich layer, to open said sandwich so that said film chip can fall out therefrom.

10. The apparatus described in claim 12 wherein:
said slide is mounted for movement with said package away from said tab engaging means; and including depressing means mounted on said slide for urging an end of said package through said slot; and
cam means for operating said depressing means when said slide is over said slot.

11. Apparatus for disassembling a film chip package which includes a light-tight envelope with tab means thereon, a sandwich with a pair of protective layers disposed within said envelope, and a film chip disposed between said layers of said sandwich, comprising:
a light-tight housing with an exit opening for passing a film chip into further processing apparatus;
means mounted on said housing for engaging said tab on said envelope and moving said package in a predetermined manner while preventing movement of said tab therewith, to strip away at least a portion of said envelope; and
layer separating means for separating said layers of said protective sandwich to allow said film chip to fall out therefrom, including means defining a convex guiding wall and a member slideably mounted on said housing and having a layer engaging portion for engaging one of said standwich layers and pulling it along said convex guiding wall to separate it from the other sandwich layer so that said film chip can fall out from between said sandwich layers.

References Cited

UNITED STATES PATENTS

| | | | |
|---|---|---|---|
| 3,437,030 | 4/1969 | Mastrosimone et al. | 95—93 |
| 3,277,809 | 10/1966 | Guzzardi et al. | 95—94 |
| 3,477,896 | 11/1969 | Townsend et al. | 156—584 |
| 3,266,797 | 8/1966 | Stievenart | 156—584 |

BENJAMIN A. BORCHELT, Primary Examiner

J. V. DORAMUS, Assistant Examiner

U.S. Cl. X.R.

95—93